June 22, 1971 A. A. WILSON 3,586,538

GLASS STERILIZING APPARATUS

Filed Dec. 23, 1968 3 Sheets-Sheet 1

Albert A. Wilson, Inventor
by Lyle G. Trorey,
Agent

Albert A. Wilson,
Inventor by Lyle G. Trorey,
Agent

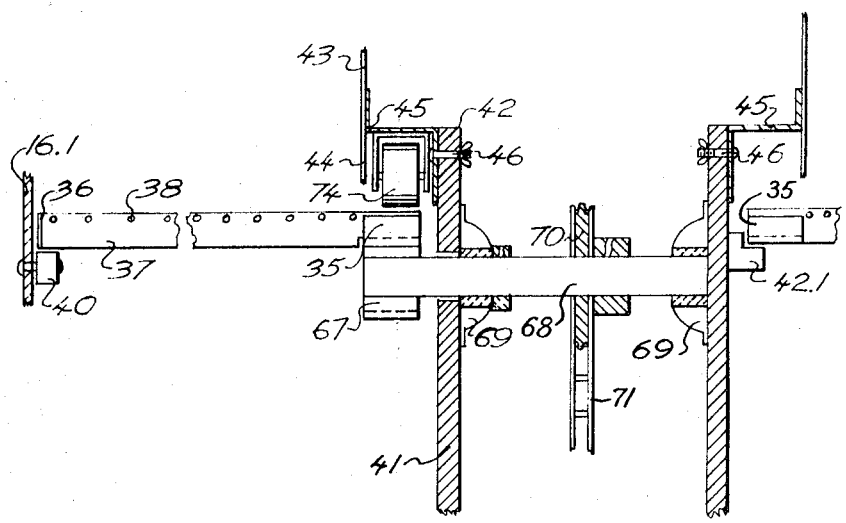
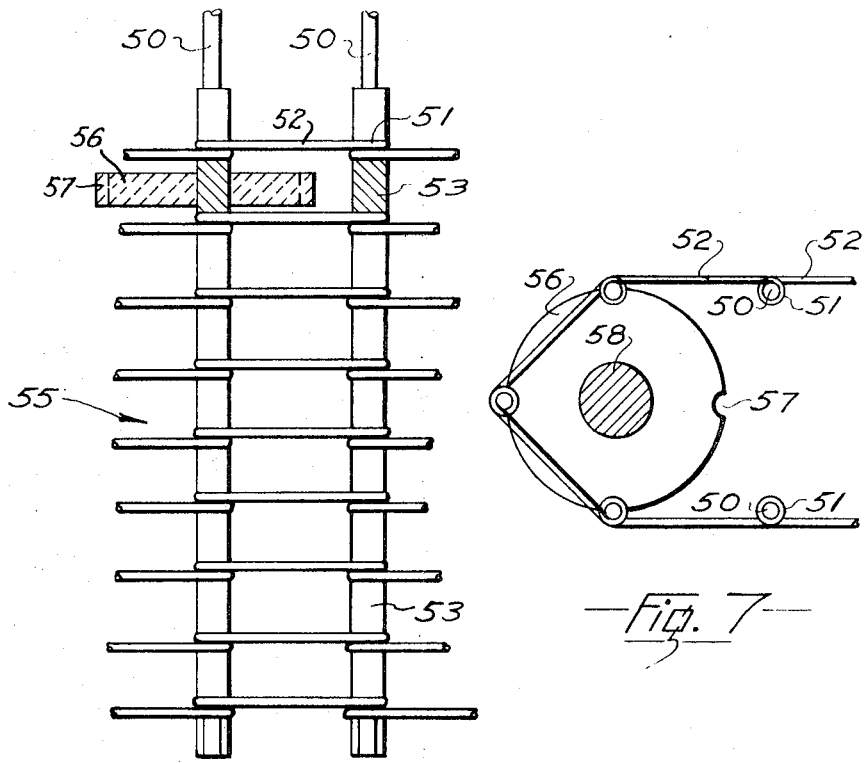

United States Patent Office 3,586,538
Patented June 22, 1971

3,586,538
GLASS STERILIZING APPARATUS
Albert A. Wilson, Vancouver, British Columbia, Canada, assignor to Leland Mfg. Co. Ltd., Vancouver, British Columbia, Canada
Filed Dec. 23, 1968, Ser. No. 786,007
Int. Cl. B08b *3/02*
U.S. Cl. 134—68    4 Claims

ABSTRACT OF THE DISCLOSURE

Sterilizing apparatus having an endless conveyor for feeding articles to be washed onto a turntable which moves the articles through washing, sterilizing and rinsing sprays, after which said articles are removed from the turntable onto a second conveyor by a deflector extending across the turntable in the path of the articles thereon. A partitioned drip collecting pan is located beneath the turntable to prevent intermingling of the sterilizing liquid with the washing and rinsing liquids.

BACKGROUND OF THE INVENTION

This invention relates to sterilizing apparatus and more particularly to sterilizing apparatus of a type for washing and sterilizing drinking glasses in cocktail bars and the like.

In order to reduce labour costs involved in the cleaning of drinking glasses and the like, particularly in cocktail bars, and to reduce breakage; automatic washing and sterilizing devices have heretofore been designed and constructed whereby it is only necessary for a waiter to deposit used glasses on a continuously moving conveyor, whence the glasses are carried through washing, sterilizing and rinsing sprays and are then deposited in a storage area ready for reuse by the bartender.

In some sterilizing devices of prior design, a single conveyor is employed which moves at a constant speed through the sprays. In other devices of this type, two conveyors running in opposite directions are sometimes employed, there being an infeed conveyor taking the glasses into and through the sprays and an outfeed conveyor returning the glasses to the storage area. In the first type of conveyor, as the glasses must travel linearly, the total length of the entire device precludes its use in bars where space is at a premium. Furthermore, as it is impossible to vary the travelling speed of the glasses through the sterilizing area relative to the infeed and outfeed speeds thereof, the conveyor must travel at relatively low speeds in order to permit the glasses to remain in the washing, sterilizing and rinsing area for a sufficient length of time.

In the second, or two conveyor type apparatus, although the total length of the apparatus may be radically reduced over the single conveyor type, here again the speed of travel through the washing, sterilizing and rinsing area must be the same as the infeed and outfeed speed of travel of the glasses. Furthermore, in this type of apparatus, the conveyors run side by side. Consequently, the soiled glasses must pass the clean glasses. The clean glasses, therefore, may be soiled if the waiters are not extremely careful in loading the infeed conveyor.

If both of these types of apparatus as the flexible conveyors must pass through a washing spray, they cannot be properly lubricated and consequently suffer considerable wear. In fact, it is not desirable to lubricate these flexible conveyors as the glasses they carry may become soiled with the lubricant after being washed.

SUMMARY OF THE INVENTION

The present invention provides a sterilizing apparatus wherein a pair of endless conveyors are employed to feed to and carry glasses away from a turntable, the latter moving the glasses through washing, sterilizing and rinsing sprays. The present apparatus can, therefore, be much shorter in length than the single conveyor apparatus as the glasses are moved through an arc as they are being cleaned. Furthermore, the travelling speed of the turntable can be adjusted relative to the travelling speed of both endless conveyors. This permits adjustment of duration of time that the glasses are exposed to the sprays without affecting the travelling speeds of the endless conveyors.

Furthermore, the present invention provides a sterilizing apparatus where the means for conveying the glasses through the cleaning sprays can be provided with lubricant at all times so as to prolong the entire life of the apparatus.

The apparatus also employs a partitioned drip collecting pan arranged beneath the turntable to prevent intermingling of the various liquid solutions used in cleaning the glasses whereby recirculation of undiluted cleaning solution may be obtained.

The construction of the sterilizing apparatus of the present invention also permits it to be easily and quickly disassembled and reassembled for cleaning purposes.

BRIEF DESCRIPTION OF THE DRAWINGS

FIG. 4 is a central sectional side view of a portion of the apparatus illustrating the turntable and the drive mechanism therefor.

FIG. 6 is a plan view of a portion of an endless flexible conveyor.

FIG. 7 is a sectional view taken along line 7—7 of FIG. 6.

DESCRIPTION OF PREFERRED EMBODIMENT

Figure 1:
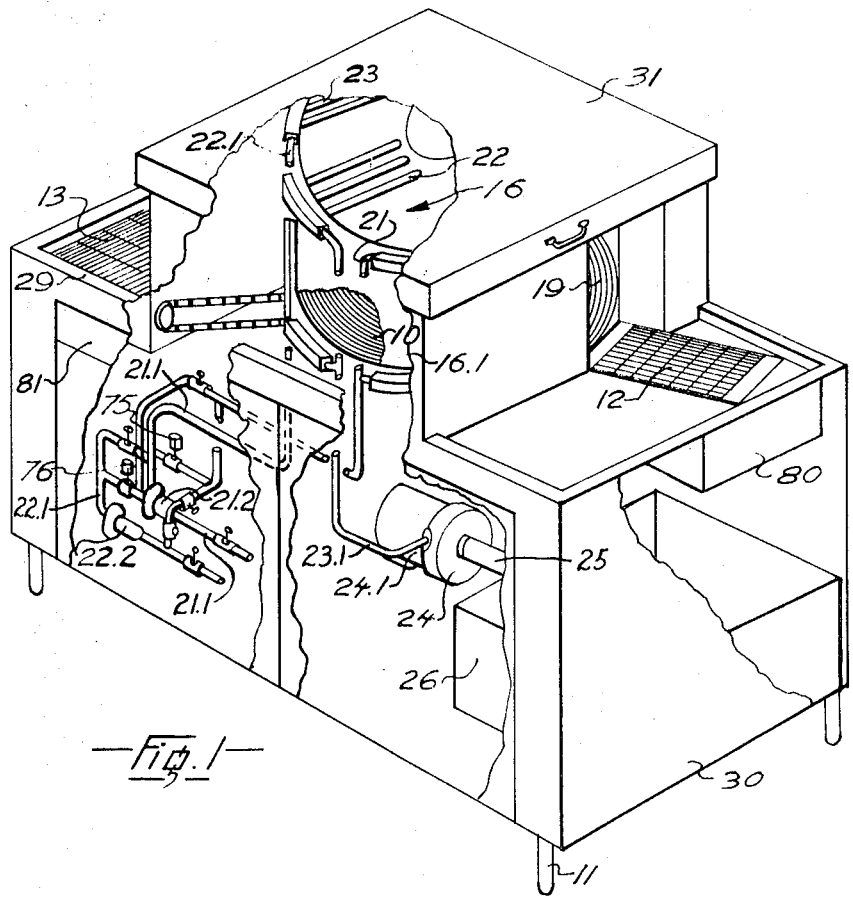
FIG. 1 is an isometric view of the sterilizing apparatus with portions thereof removed for purposes of clarity of illustration.
Figure 2:
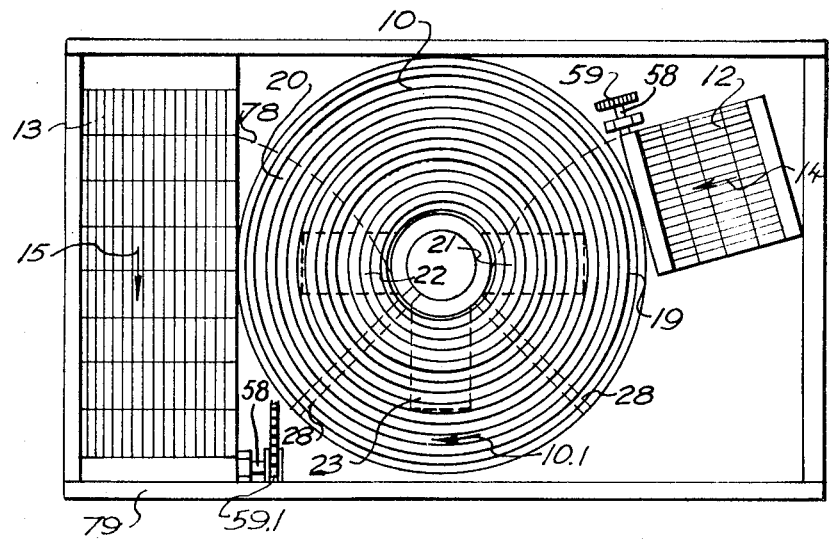
FIG. 2 is a diagrammatic plan view of the apparatus illustrating the positioning of endless conveyors and a turntable in relation to each other.
Figure 3:
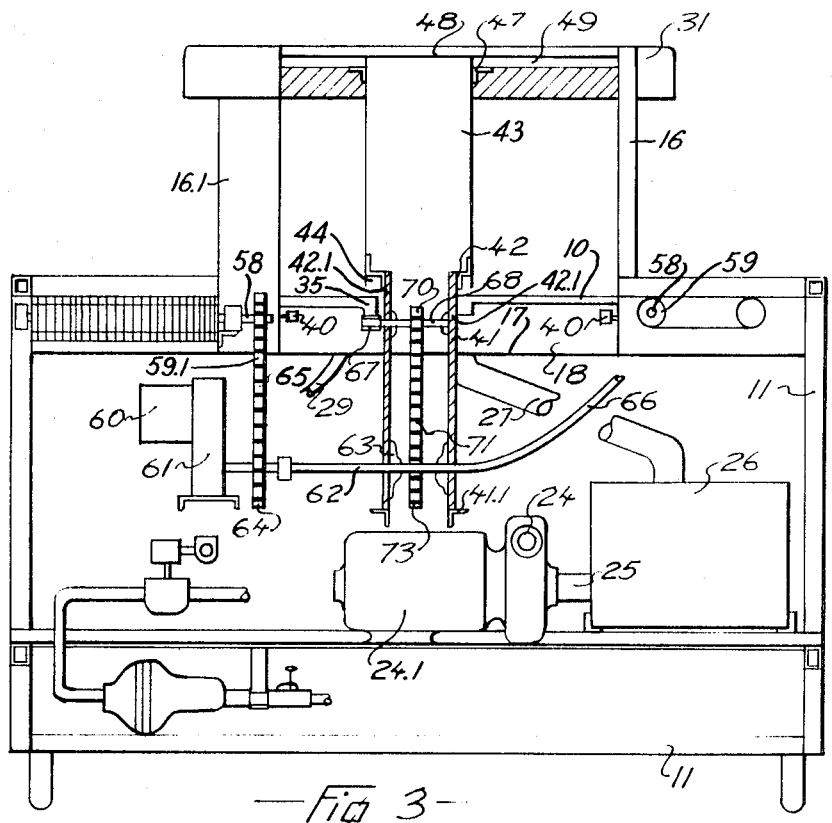
FIG. 3 is a central sectional side view of the apparatus with portions thereof removed for purposes of clarity of illustration.

Referring to the drawings, and in particular to FIGS. 1, 2 and 3 thereof, the reference numeral 10 indicates a turntable mounted centrally in a supporting frame 11 for rotation about a vertical axis in the direction indicated by the arrow 10.1. Endless flexible conveyors 12 and 13 are mounted on the supporting frame adjacent the turntable 10 in substantially diametrically opposite relationship to each other. Conveyor 12 is driven so that its upper run moves in the direction indicated by the arrow 14, while conveyor 13 is arranged so that it moves in the direction indicated by the arrow 15. Both conveyors are arranged so that their upper runs are level with the turntable 10.

Numeral 16 indicates a cylindrical housing having a wall 16.1 enclosing the turntable 10. This housing has an annular bottom 17 spaced below the turntable forming an annular drip collecting pan 18. The housing 16 is provided with an opening 19 adjacent to conveyor 12 and with a similar opening, not shown in FIG. 1, but indicated at 20 on FIG. 2 adjacent to conveyor 13.

Batteries of spray elements (FIG. 1) 21, 22 and 23 are arranged in the housing beneath and above the turntable. Battery 21 is connected through conduits 21.1 and pressure reducing valve 21.2 to a source of hot water. Battery 22 is connected via conduits 22.1 and pressure reducing valve 22.2 to a source of cold water. Battery 23 is connected via conduits 23.1 to a pump 24 driven by an electric motor 24.1, said pump having a conduit connection 25 to a tank 26 which contains a chemical detergent sterilizing solution. This tank is connected via a drain pipe 27 to the drip collecting pan 18.

The drip collecting pan, see FIG. 2, is provided with partition walls 28 extending radially on either side of the battery of spray elements 23 so as to prevent intermingling in the drip collecting pan of the water issuing from batteries 21 and 22 and the sterilizing spray issuing from battery 23. The drain pipe 27, FIG. 3, is connected to the drip collecting pan between the partition walls 28 so as to return any sterilizing solution from the pan back to the tank 26. The drip collecting pan also has a conduit connection 29 outside of the partition walls 28, with a common drain, not shown, so as to waste the hot/cold water issuing from batteries 21 and 22.

An outer cover 30 completely encloses the frame and provides an eye-pleasing finish for the apparatus. This cover is provided with a removable lid 31.

Figure 5:
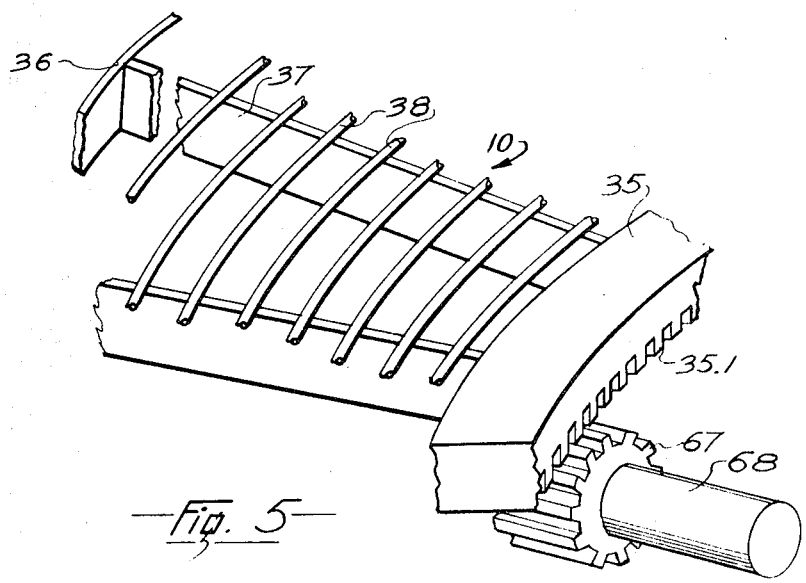
FIG. 5, on sheet one of the drawings, is an isometric view of a portion of the turntable and drive mechanism illustrated in FIG. 4.

The turntable 10, as illustrated in FIGS. 4 and 5, is annular, having an inner rim 35, provided with gear teeth 35.1 connected to an outer rim 36 by radially extending supports 37. These supports serve as a base for concentrically arranged stain-less steel wire rings 38, spaced apart to permit the spray from the batteries of spray elements to pass therethrough.

The turntable, FIG. 3, is supported by rollers 40 connected to the wall 16.1 of the housing.

The supporting framework includes a centrally located tubular support 41 arranged in a vertical position and supported at its lower end by braces 41.1, an upper end 42 of said support extending through the bottom of the annular drip collecting pan and turntable 10. This tubular support 41, FIG. 4, has secured thereto, adjacent its upper end 42, a guide ring 42.1 which slidably engages the inner rim 35 of the turntable so as to maintain the turntable centrally of the housing.

The tubular support 41 is surmounted by a vertically arranged tubular core 43 of larger diameter than support 41, said core 43 having at its lower end 44 brackets 45 which are releasably securable to the support 41 by wing nuts and bolts 46. The core 43, FIG. 3, is also provided with an annular bracket 47 adjacent its upper end 48, said bracket 47 serving as a seat for supporting an annular housing lid 49.

FIGS. 6 and 7 detail the construction of the conveyors 12 and 13, the latter being substantially identical. As illustrated in these latter figures, the conveyors are formed of a plurality of transversely extending rods 50, which extend through eyes 51 at opposite ends of short lengths of wire 52, the latter serving as links of the conveyor. The wire links 52 are spaced apart by spacers 53 rotatably mounted on the rods 50, the forming endless flexible belts 55 and 55.1. The belt of each conveyor passes over groups of wheels 56 having bites 57 in which the spacers 53 seat. One of the groups of wheels 56 of each conveyor is a drive group which have non-rotatable connections to drive shafts 58. As illustrated in FIG. 2, the drive shafts 58 of both conveyors are provided with sprockets 59 and 59.1.

Motive power for both conveyors 12 and 13 and the turntable 10 is provided by an electric motor 60 which, through a reduction gear 61, drives a common drive shaft 62, the latter passing through the support 41 and be rotatably supported in bearing 63. This drive shaft has a sprocket 64 which has a driving connection via a chain 65 with sprocket 59.1.

The sprocket of conveyor 12 has a driven connection with the common drive shaft 62 via a flexible drive shaft 66.

The drive to the turntable 10 is clearly illustrated in FIGS. 3 and 4. As illustrated, the gear teeth 35.1 on the inner rim 35 mesh with a pinion 67 mounted on one end of a transfer shaft 68 which extends into the support 41 and is rotatably mounted in bearings 69. A sprocket 70, non-rotatably secured to the shaft 68 has a chain driven connection 71 with a sprocket 73 mounted in a similar manner on common drive shaft 62.

In order to prevent the turntable from jumping off the pinion 67, a roller 74, FIG. 4, is secured to the bracket 45 just above the pinion 67, said roller 74 engaging the inner rim 35.

Operation of the sterilizer, which can be of intermittent or continuous nature, is effected by manual operation of a common electrical switch, not shown, which through suitable electrical leads, not shown, controls the operation of motors 60 and 24.1 and solenoid control valves 75 and 76 controlling the flow of hot and cold water through conduits 21.1 and 22.1. A bar-tender places the sterilizing apparatus in readiness by simply closing the common switch which energizes the motors as aforesaid and permits the passage of hot and cold water to the batteries of sprays 21 and 22. At the same time motor 60 drives the conveyors 12 and 13 and turntable 10 while the pump 24 operates to pump the sterilizing solutions through the battery of spray elements 23.

The waiters need only place the soiled glasses to be washed in an inverted position on conveyor 12 so that the glasses are moved through the opening 19 in the housing and onto the turntable 10. As the latter rotates, the glasses move through the liquid spray issuing from the batteries 21, 22 and 23 and then engage an arcuately shaped deflector 78 positioned across the turntable in the path of the glasses so as to slide the latter radially outwardly over the turntable and onto conveyor 13. This latter conveyor will convey the glasses away from the opening 20 until they are stopped by a stop-bar 79 at the end of the upper run of conveyor 13.

During the passage of the glasses over conveyor 12, any debris such as cigarette butts and the like which may be in the glasses fall through the conveyor into a removable drip collecting pan 80 positioned there beneath. Conveyor 13 also has a removable drip collecting pan 81 which can be removed for emptying at the end of each day's operation.

As will be appreciated, it may, in some circumstances, be advisable to delay passage of glasses and like articles through the batteries of sprays in order that they can be thoroughly cleaned. In order to do this and yet maintain relatively fast infeed and outfeed speeds of the conveyors 12 and 13, sprockets 70 and 64 having suitable pitch diameters can be used to obtain required rotational speed of the turntable without changing conveyor speed.

Construction of the sterilizer, as aforesaid, permits it to be easily and quickly disassembled and reassembled in order that it can be regularly cleaned. In order to clean the drip collecting pan 18 and housing 16, it is only necessary to lift the housing lid off the core 43 and remove the latter by releasing the wing nuts and bolts 46. The turntable can then be lifted out of the housing so as to permit the latter to be thoroughly cleaned.

I claim:
1. Sterilizing apparatus including:
 (a) an open top turntable,
 (b) a first conveyor for feeding articles to be cleaned onto the turntable,
 (c) means for driving the turntable and the first conveyor said means including:
  (i) a motor,
  (ii) a common drive shaft connected to the motor,
  (iii) a sprocket on the drive shaft,
  (iv) a sprocket connected to the turntable,
  (v) a chain drivingly connecting the sprockets,
  (vi) a flexible drive shaft operably connecting the common drive shaft and first conveyor,
   at least one of the sprockets being removable that a sprocket of different pitch diameter can be used so as to enable rotational speed of the turntable to be altered without altering travelling speed of the first conveyor, (d) spray elements arranged below and above the turntable for spraying, in succession, washing, sterilizing and rinsing liquids over the articles as they are moved by the turntable, (e) and a deflector arranged over the turntable for removing articles after the latter have passed through the rinsing liquid.

2. Structure as defined in claim 1 including a second conveyor at the deflector for receiving articles deflected from the turntable and conveying the latter to a waiting site.

3. Structure as defined in claim 1 including a drip collecting pan beneath the turntable the pan being partitioned to prevent intermingling of the sterilizing liquid with the washing and rinsing liquids, and including means for recirculating the sterilizing liquid back through the spray elements.

4. Structure as defined in claim 1 in which the turntable is formed of a plurality of wire rings supported on radially extending braces, said rings being spaced apart to provide passage therethrough of the liquids issuing from the spray elements.

References Cited

UNITED STATES PATENTS

| | | | |
|---|---|---|---|
| 777,321 | 12/1904 | Vance et al. | 134—67 |
| 1,681,839 | 8/1928 | Breton | 134—80 |
| 1,879,224 | 9/1932 | Hauk | 134—81 |
| 2,443,091 | 6/1948 | Zademach | 134—80 |
| 3,292,646 | 12/1966 | Pollock | 134—67 |

ROBERT L. BLEUTGE, Primary Examiner

U.S. Cl. X.R.

134—80, 134